United States Patent
Aybay

(10) Patent No.: US 9,269,307 B1
(45) Date of Patent: Feb. 23, 2016

(54) VISUAL ALERT SYSTEMS AND METHODS FOR DATA PROCESSING UNITS

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1191 days.

(21) Appl. No.: 12/415,132

(22) Filed: Mar. 31, 2009

(51) Int. Cl.
G09G 3/34 (2006.01)

(52) U.S. Cl.
CPC .............................. *G09G 3/3426* (2013.01)

(58) Field of Classification Search
CPC .................... G05B 23/0272; G05B 23/0216
USPC ..................... 345/102; 340/331, 540, 635
See application file for complete search history.

(56) References Cited

U.S. PATENT DOCUMENTS

| | | | |
|---|---|---|---|
| 4,051,522 A | 9/1977 | Healy et al. | |
| 5,610,594 A * | 3/1997 | Baumann et al. | 340/658 |
| 5,646,645 A | 7/1997 | Saegusa | |
| 6,384,842 B1 * | 5/2002 | DeKoning et al. | 715/734 |
| 6,533,757 B1 | 3/2003 | Lampropoulos et al. | |
| 6,789,206 B1 * | 9/2004 | Wierzbicki et al. | 713/300 |
| 7,050,026 B1 | 5/2006 | Rosen | |
| 7,166,930 B2 | 1/2007 | Young | |
| 7,340,333 B2 * | 3/2008 | Lenneman et al. | 701/36 |
| 2002/0067277 A1 * | 6/2002 | Nishimura et al. | 340/635 |
| 2003/0079671 A1 * | 5/2003 | Ichikawa et al. | 116/286 |
| 2003/0169579 A1 * | 9/2003 | Larson et al. | 361/796 |
| 2004/0171410 A1 * | 9/2004 | Deeds | 455/575.1 |
| 2004/0252329 A1 | 12/2004 | Sorenson | |
| 2007/0293236 A1 * | 12/2007 | Cox et al. | 455/456.1 |
| 2008/0313539 A1 * | 12/2008 | McClelland et al. | 715/705 |

\* cited by examiner

*Primary Examiner* — Kathy Wang-Hurst
*Assistant Examiner* — Jose Soto Lopez
(74) *Attorney, Agent, or Firm* — Cooley LLP

(57) ABSTRACT

A data processing unit, which is operatively coupled within a data center network, is configured to output a first visual indicia, a second visual indicia and a third visual indicia. The first visual indicia includes a set of light outputs, each of which is associated with a port status of a network port of the data processing unit. The second visual indicia includes a set of graphical outputs produced by a display screen, each of which is associated with an operating status of the data processing unit. The third visual indicia includes a set of backlight outputs produced by the display screen, each of which is associated with the operating status of the data processing unit.

21 Claims, 4 Drawing Sheets

VISUAL ALERT SYSTEMS AND METHODS FOR DATA PROCESSING UNITS

BACKGROUND

This invention relates to electronic data processing units, and more particularly, to apparatus and methods for producing a visual alert associated with the operation of a data processing unit.

Some known communications networks are operably coupled to one or more data centers, which are centralized locations where data processing resources (e.g., routers, switches, servers, storage devices, and/or computing devices) are located. Some known data centers are configured to process, route and/or transmit electronic and/or optical signals to various nodes within the communications network. Some known data centers include large numbers (e.g., on the order of one hundred thousand) of data processing units.

The front panel of known data processing units can include one or more light-emitting diodes (LEDs) and/or a display screen (e.g., liquid crystal display screens). The LEDs and the display screen can produce different outputs associated with a status of the communications network, the operation of the data processing unit or the like. For example, some known data processing units include one or more LEDs that produce a flashing light to indicate the status of data transmission via the data processing units. Some known data processing units include a display screen configured to output a fault code associated with a status of the operation of the data processing unit. Outputs produced by the LEDs and/or the display screen, however, can be easily blocked by cables, connectors and the like. Moreover, such outputs can be difficult to see and/or interpret from a distance, when viewed at an angle and/or when the data processing unit is located adjacent a large number of other data processing units.

Thus, a need exists for improved apparatus and methods for producing a visual alert associated with the operation of a data processing unit.

SUMMARY

Data processing units are described herein. In some embodiments, a data processing unit, which can be operatively coupled within a data center network, is configured to output a first visual indicia, a second visual indicia and a third visual indicia. The first visual indicia includes a set of light outputs, each of which is associated with a port status of a network port of the data processing unit. The second visual indicia includes a set of graphical outputs produced by a display screen, each of which is associated with an operating status of the data processing unit. The third visual indicia includes a set of backlight outputs produced by the display screen, each of which is associated with the operating status of the data processing unit.

DETAILED DESCRIPTION

Figure 1:
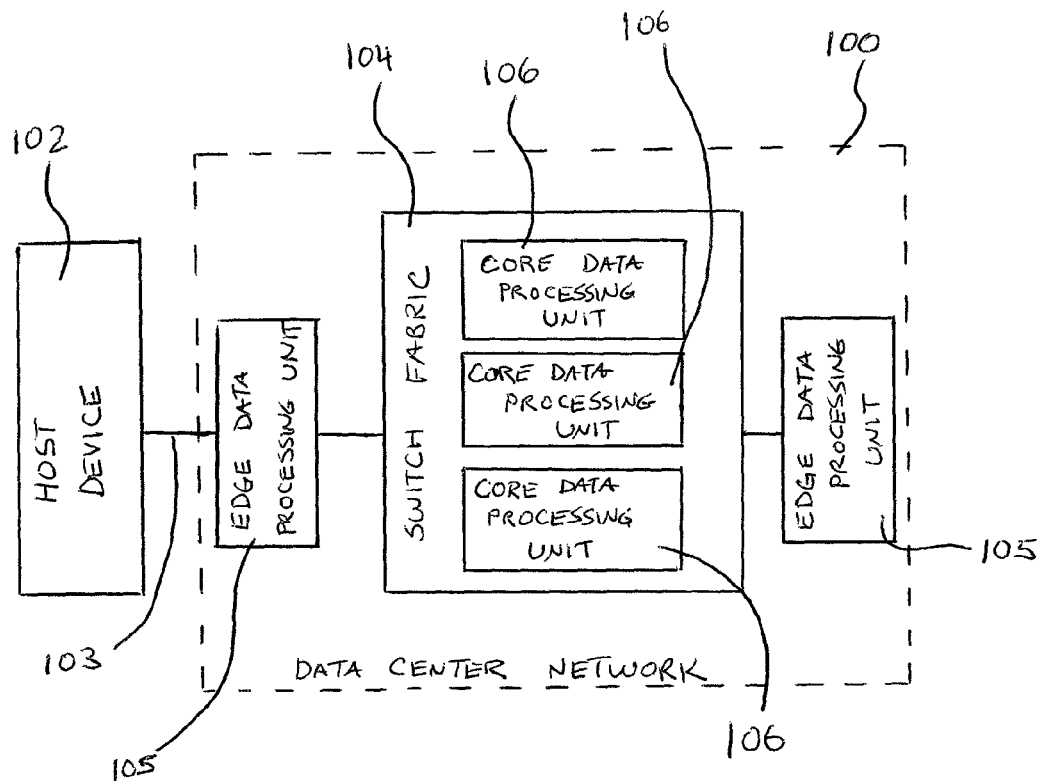
FIG. 1 is a schematic block diagram of a data center network including a data processing unit according to an embodiment.

Data processing units are described herein. In some embodiments, a data processing unit, which can be operatively coupled within a data center network, is configured to output a first visual indicia, a second visual indicia and a third visual indicia. The first visual indicia includes a set of light outputs, each of which is associated with a port status of a network port of the data processing unit. The first visual indicia can be produced, for example, by one or more light emitting diodes (LEDs). The second visual indicia includes a set of graphical outputs produced by a display screen, each of which is associated with an operating status of the data processing unit. The graphical outputs can include, for example, a textual indicia, fault code, or the like associated with a fan fault, a thermal fault or a power supply fault. The third visual indicia includes a set of backlight outputs produced by the display screen, each of which is associated with the operating status of the data processing unit. In some embodiments, each backlight output from the set of backlight outputs has a characteristic associated with the operating status of the data processing unit. Such characteristics can include, for example, a color of the backlight, a brightness of the backlight or contrast of the backlight.

In some embodiments, a data processing unit configured to be operatively coupled within a data center network can include a network port, a set of light emitting diodes, a display screen and a display controller. The network port is configured to operatively couple the data processing unit to another data processing unit associated with the data center network. Each light emitting diode from the set of light emitting diodes is configured to produce an output having a characteristic associated with a status of the network port. The display screen, which can be, for example, a liquid crystal display screen, is configured to produce a backlight output. The display controller is configured to control the backlight output in response to a change in an operating status of the data processing unit. For example in some embodiments, the backlight controller can change the color and/or the brightness of the backlight output. In other embodiments, the backlight controller can repeatedly change the backlight output at a predetermined frequency (e.g., resulting in a flashing backlight output).

In some embodiments, a method includes producing a first visual indicia associated with a port status of a network port of a data processing unit. The data processing unit, which can be, for example, a switch, a router, a data storage unit (e.g., a memory device) or the like, is configured to be operatively coupled within a data center network. A graphical output is produced via a display screen coupled to the data processing unit. The graphical output is associated with an operating status of the data processing unit. The graphic output can include, for example, a fault code, a textual indicia or the like. A backlight output is produced via the display screen. The backlight output is associated with the operating status of the data processing unit.

As used herein the term "data processing unit" refers to any computer, electronic switch, switch fabric, portion of a switch fabric, router, host device, data storage device, line card or the like used to process, transmit and/or convey electrical and/or optical signals. A data processing unit can include, for example, a component included within an electronic communications network. In some embodiments, for example, a data processing unit can be a component included within or forming a portion of a core switch fabric of a data center. In other embodiments, a data processing unit can be an access switch located at an edge of a data center, or a host device (e.g., a server) coupled to the access device. For example, an access switch can be located on top of a chassis containing several host devices.

FIG. 1 is a schematic block diagram of a data center network 100 according to an embodiment. The data center network 100 include a set of devices and/or data processing units that are interconnected to route data (e.g., a data packet, a string of bit values and/or a payload of data) between various host devices 102 (only one host device 102 is shown in FIG. 1). The host device 102 is operably coupled to the data center network 100 via a communications link 103. The host device 102 can be any type of data processing unit configured, for example, to execute various applications and/or store data. Specifically, the host device 102 can be any type of device or data processing unit configured to send data over the switch fabric 104 to a destination entity and/or receive data from a destination entity via the edge data processing units (or network devices) 105.

The edge data processing units (or network devices) 105 can be configured to function as access or gateway devices between the switch fabric 104 and the host device 102 and/or other devices (not shown), which can be configured to handle data based on different protocols. For example, in some embodiments, the host device 102 can be configured to communicate based on an Ethernet protocol and the switch fabric 104 can be a cell-based fabric where one or more portions of data (e.g., data packets) are transmitted via the switch fabric 104 in one or more cells (e.g., variable size cells, fixed size cells). In other words, the edge data processing units 105 can provide the host device 102, which can be configured to communicate via one protocol, with access to the switch fabric 104, which can be configured to communicate via another protocol. In some embodiments, the edge data processing units 105 can be referred to and/or configured to function as an access switch, a router, a network hub device, and/or a network bridge device.

The switch fabric 104, which can be a multi-stage switch fabric (e.g., 3-stage switch fabric, 5-stage switch fabric), includes multiple core data processing units 106. The core data processing units 106 can be, for example, switches, routers, data storage devices or the like that are configured to perform the functions of the switch fabric 104. For example, although not shown, the switch fabric 104 can include an ingress stage, a middle stage, and an egress stage. In some embodiments, the switch fabric 104 can be a reconfigurable (e.g., a rearrangeable) switch fabric and/or a time-division multiplexed switch fabric. In some embodiments, the switch fabric 104 can be a cell-based switch fabric configured to transmit one or more cells (e.g., fixed-size cells, variable-size cells) that can include various type of data such as portions of one or more data packets. In some embodiments, the switch fabric 104 can be a lossless or substantially lossless switch fabric (e.g., not based on lossy best-effort transmission protocol). In some embodiments, switch fabric 104 can be defined based on a Clos network architecture (e.g., a strict sense non-blocking Clos network, a Benes network) and the switch fabric 104 can include a data plane and a control plane.

In some embodiments, the functionality of the host device 102 can be substantially separate from functions related to, for example, routing and management of traffic within the data center network 100. For example, in some embodiments, the host device 102 can be a server device (e.g., a web server device) configured to host several guest operating systems handling data for, for example, a user/customer while the functionality of the edge data processing unit 105 can be substantially related to routing and management of the data center network 100. In some embodiments, the host device 102 and the edge data processing units 105 can be controlled by different administrative entities (e.g., different administrative organizations).

In some embodiments, one or more portions of the host device 102, one or more portions of the switch fabric 104, one or more portions of the core data processing unit 106 and/or one or more portions of the edge data processing unit 105 can be a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). In some embodiments, one or more of the functions associated with the host device 102 can be included in different modules and/or combined into one or more modules. In some embodiments, one or more of the functions associated with the edge data processing unit 105 can be included in different modules and/or combined into one or more modules.

In some embodiments, the edge data processing unit 105, the host device 102 and/or the core data processing unit 106 can be included in one or more chassis. For example, in some embodiments, the edge data processing unit 105 can be a top-of-rack (TOR) device associated with a chassis, and the host device 102 can be a blade server within the chassis. Although the block diagram of FIG. 1 shows only two edge data processing units 105 and three core data processing units 106, in some embodiments, a data center network 100 can include on the order of one hundred thousand of data processing units (e.g., edge data processing units 105 and core data processing units 106).

Figure 2:
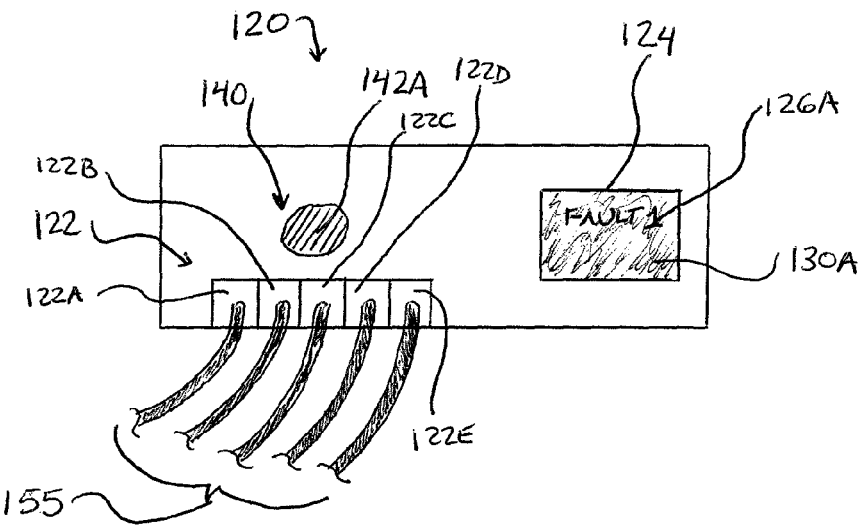
FIGS. 2 and 3 are schematic illustrations of the data processing unit shown in FIG. 1, in a first configuration and second configuration, respectively.
Figure 3:
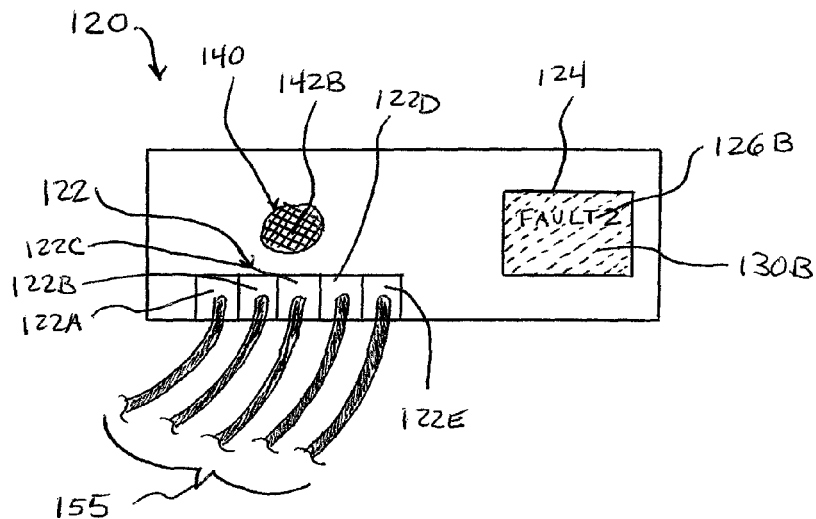

FIGS. 2 and 3 are schematic illustrations of a data processing unit 120 that can be included within the data center network 100, in a first configuration and a second configuration, respectively. The data processing unit 120 can be any suitable data processing unit of the types described herein. In some embodiments, for example, the data processing unit 120 can be one of the edge data processing units 105 and/or one of the core data processing units 106 shown in FIG. 1. In some embodiments, the data processing unit 120 can be a switch, a router, a server, a data storage unit (e.g., a memory device), line card or the like.

The data processing unit 120 includes network port 122, a light source 140 and a display screen 124. The network port 122 is the physical and/or logical interface between the data processing unit 120 and other components within the data center network 100. The network port 122 includes a set of connectors 122A, 122B, 122C, 122D and 122E, each configured to engage and/or receive a corresponding connector from a set of network cables 155. In this manner, data can be send and/or received between the data processing unit 120 and the other components within the data center network 100. Although shown as including five connectors (e.g., connectors 122A, 122B, 122C, 122D and 122E), in other embodiments, the network port 122 can include any number of connectors. In yet other embodiments, the network port 122 can be devoid of any physical connector. In such embodiments, the data processing unit 120 can be operatively coupled to the data center network 100 via a wireless connection.

The light source 140 can be any suitable light source for outputting light, such as for example, a light emitting diode (LED), an incandescent light or a fluorescent light. The light source 140 is adjacent the network port 122 and is configured to output a set of light outputs (or visual indicia), each associated with a status of the network port 122. Similarly stated, the light source 140 is configured to produce multiple different light outputs (represented as light outputs 142A and 142B in FIGS. 2 and 3, respectively), each corresponding to a status of the network port 122. In this manner, an observer can ascertain information about the status of the network port 122 by observing the output of the light source 140. In some embodiments, for example, a characteristic of the first light output 142A can be different than a characteristic of the second light output 142B. Each of the characteristics can be associated with a particular status of the network port 122. For example, in some embodiments, the light source 140 can be configured to output the first light output 142A having a first color associated with a first status of the network port 122, and can be configured to output the second light output 142B having a second color associated with a second status of the network port 122. Similarly, the first light output 142A can have a different brightness and/or pattern (on/off duration, frequency of a flashing pattern or the like) than a brightness and/or pattern of the second light output 142B.

In some embodiments, each characteristic or combination of characteristics of the visual indicia (or light) produced by the light source 140 can be correlated to a particular status of the network port 122. Similarly stated, in some embodiments, each characteristic or combination of characteristics of the visual indicia output by the light source 140 can be associated with a status of the network port 122 via a one-to-one mapping. For example, in some embodiments, a GREEN light output indicates that a network link via the network port 122 has been established. A RED light output can indicate that a network link via the network port 122 has not been established (or has failed). A bright RED light output can indicate that a network link via the network port 122 has not been established for a period of time exceeding a predetermined time threshold. A flashing GREEN light output can indicate that data is being transmitted via the network port 122 at a speed greater than a first speed threshold (e.g., 100 Mbps). A flashing BLUE light output can indicate that data is being transmitted via the network port 122 at a speed greater than a second speed threshold (e.g., 1 Gbps). The preceding are only examples of the mapping of the characteristics of the visual indicia (or light) produced by the light source 140 to the status of the network port 122, and are not intended to be limiting.

In other embodiments, each characteristic or combination of characteristics of the visual indicia (or light) produced by the light source 140 can be correlated to more than one status of the network port 122. Similarly stated, in some embodiments, each characteristic or combination of characteristics of the visual indicia produced by the light source 140 can be associated with a status of the network port 122 via a one-to-many mapping. For example, in some embodiments, a brightness of the visual indicia can indicate that a particular status of the network port 122 has changed within a predetermined time period.

The display screen 124 is configured to output a set of graphical outputs (or a first visual indicia) and a set of backlight outputs (or a second visual indicia), each associated with an operating status of the data processing unit 120. More particularly, the display screen 124 is configured to output at least a first graphical output 126A (FIG. 2) and a second graphical output 126B (FIG. 3), each associated with an operating status of the data processing unit 120. The graphical outputs 126A, 126B can include, for example, an alphanumeric code, graphical symbol, an icon, or the like. In this manner, an observer can ascertain information about the operating status of the data processing unit 120 by observing the graphical outputs 126A, 126B produced by the display screen 124.

In some embodiments, for example, the first graphical output 126A can be different than the second graphical output 126B. More particularly, the first graphical output 126A can be fault code, message or the like associated with a first operating status of the data processing unit 120, and the second graphical output 126B can be fault code, message or the like associated with a second operating status of the data processing unit 120. The operating status of the data processing unit 120 can be associated with the status of a power supply to the data processing unit 120, the status of a cooling fan (or fans) within the data processing unit 120, the temperature of a particular portion of the data processing unit 120 or the like. In some embodiments, for example, the first graphical output 126A can be an alphanumeric code associated with a cooling fan fault, and the second graphical output 126A can be an alphanumeric code associated with a power supply failure.

The display screen 124 is further configured to output at least a first backlight output 130A (indicated as a shaded portion of the display screen 124 in FIG. 2) and a second backlight output 130B (indicated as a shaded portion of the display screen by the shaded portion in FIG. 3). Each of the first backlight output 130A and the second backlight output 130B is associated with the operating status of the data processing unit 120. The backlight outputs 130A, 130B can include, for example, any suitable light output illuminating the display screen 124 substantially from the back and/or the side of the display screen 124. In this manner, an observer can ascertain information about the operating status of the data processing unit 120 by observing the backlight outputs 130A, 130B produced by the display screen 124.

In some embodiments, a characteristic of the first backlight output 130A can be different than a characteristic of the second backlight output 130B. Such characteristics can include, for example, a color of the backlight output, a brightness of the backlight output, a contrast of the backlight output and/or a pattern of the backlight output (e.g., on/off duration, frequency of a flashing pattern or the like). Each of the different characteristics can be associated with a particular operating status of the data processing unit 120. For example, in some embodiments, the display screen 124 can be configured to output the first backlight output 130A having a first color associated with a first operating status of the data processing unit 120, and can be configured to output the second backlight output 130B having a second color associated with a second operating status of the data processing unit 120.

In some embodiments, each characteristic or combination of characteristics of the backlight outputs produced by the display screen 124 can be correlated to a particular operating status of the data processing unit 120. Similarly stated, in some embodiments, each characteristic or combination of characteristics of the backlight outputs produced by the display screen 124 can be associated with an operating status of the data processing unit 120 via a one-to-one mapping. For example, in some embodiments, a GREEN backlight output indicates that no faults or conditions exists with respect to the operation of the data processing unit 120. A BLUE backlight output can indicate that power supply failure has occurred. A RED backlight output can indicate that a fan within the data processing unit 120 is not functioning properly. A flashing RED backlight output can indicate that a temperature of a portion of the data processing unit 120 has exceeded a predetermined value. The preceding are only examples of the mapping of the characteristics output by the display screen 124 to the operating status of the data processing unit 120, and are not intended to be limiting.

In other embodiments, each characteristic or combination of characteristics of the backlight outputs produced by the display screen 124 can be correlated to more than one operating status of the data processing unit 120. Similarly stated, in some embodiments, each characteristic or combination of characteristics of the backlight outputs produced by the display screen 124 can be associated with an operating status of the data processing unit 120 via a one-to-many mapping. For example, in some embodiments, a brightness of the backlight output can indicate that a particular operating status of the data processing unit 120 has changed within a predetermined time period.

In some embodiments, the size, area, shape and/or location of the display screen 124 is such that the observer can ascertain information about the operating status of the data processing unit 120 when the data processing unit 120 is arranged within a cluster of other data processing units (not shown in FIGS. 2 and 3) and/or when the observer is not directly in front of or in close proximity to the data processing unit 120. Similarly stated, in some embodiments, the size, area, shape and/or location of the display screen 124 is such that the backlight outputs 130A, 130B can be easily observed from a distance (e.g., of greater than approximately 10 feet), from an angle (e.g., an angle between the line of sight and the face plate of the data processing unit 120 of less than approximately 60 degrees), when a portion of the display screen 124 is obstructed (e.g., by cables) and/or when the data processing unit 120 is arranged within a cluster of other data processing units. For example, in some embodiments, the display screen 124 has substantially rectangular shape and an area of at least 4 square centimeters. In other embodiments, the display screen 124 is located on a portion of the faceplate of the data processing unit opposite the location of the network port 122, to avoid being obstructed by the set of cables 155.

Figure 4:
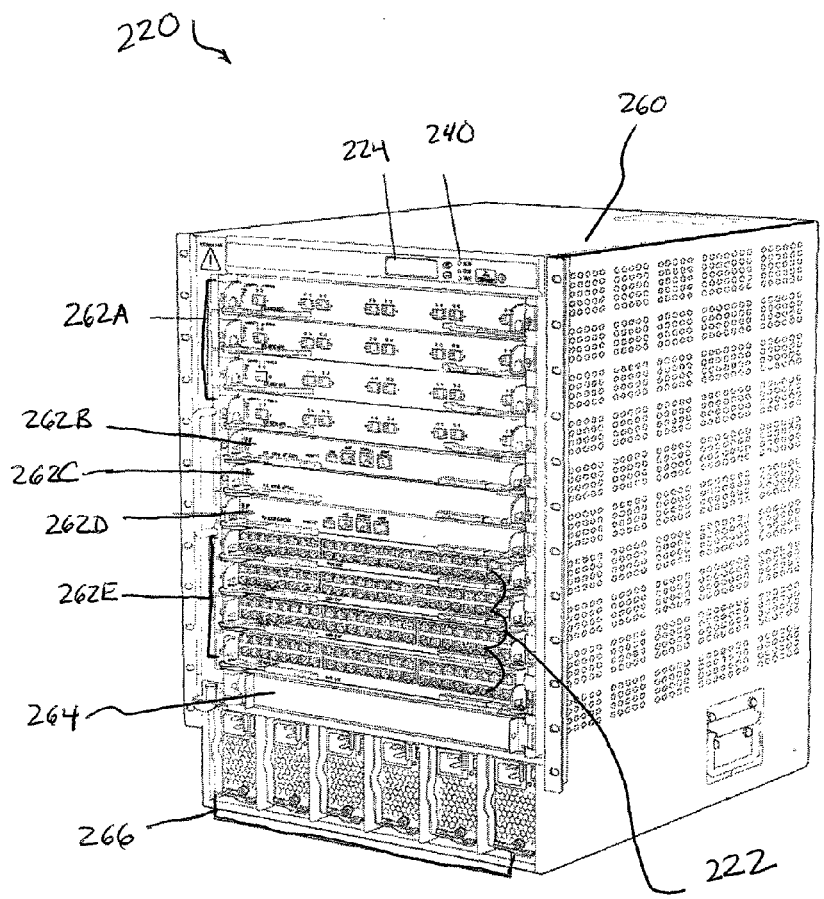
FIG. 4 is a perspective view of a data processing unit according to an embodiment.

Although the data processing unit 120 is shown and described above as being a single component (e.g., a switch, router, server, data storage unit, line card or the like within the data center network 100, in other embodiments, a data processing unit can be collection of components within the data center network 100. Similarly stated, in some embodiments, a data processing unit can include a set of components (e.g., line cards or the like) within a common chassis or frame that collectively perform a desired data processing function within the data center network 100. For example, FIG. 4 is a perspective view of a data processing unit 220 according to an embodiment. The data processing unit 220 includes a chassis 260 within which multiple types of components (identified as components 262A, 262B, 262C, 262D and 262E) are contained. The components 262A, 262B, 262C, 262D and 262E can be suitable component (a switch, router, server, data storage unit, line card or the like) described above. Although shown as including five different types of components, in other embodiments, the data processing unit 220 can include any number of different types of components and any number of a given type of component.

The chassis 260 also includes a set of power supplies 266, a fan tray 264 and defines a cooling flow path therein (not shown in FIG. 4). In this manner, the chassis 260 provides a chassis-level power source and/or cooling mechanism for the components 262A, 262B, 262C, 262D and 262E contained therein. In some embodiments, however, the components 262A, 262B, 262C, 262D and 262E can include a power supply, a fan and/or define a cooling path.

As shown in FIG. 4, the data processing unit 220 includes a light source 240 and a display screen 224. The light source 240 which can be, for example, a light emitting diode (LED), is configured to output a set of light outputs (or visual indicia), each associated with a status of one or more network ports included within the data processing unit 220. The network ports can include, for example, any of the network ports of any of the components 262A, 262B, 262C, 262D and 262E contained in the data processing unit 220 (such as, for example, the set of network ports 222 of the component 262E). Similarly stated, the light source 240 is configured to produce multiple different light outputs, each corresponding to a status of one or more network ports, as described above. In this manner, an observer can ascertain information about the status of the network ports included within the data processing unit 220 by observing the output of the light source 240.

In some embodiments, the light source 240 can be configured to produce light outputs having different characteristics associated with a particular status of a network port. As described above, such characteristics can include a color of the light output, a brightness of the light output and/or a pattern (on/off duration, frequency of a flashing pattern or the like) of the light output.

Similar to the display screen 124 described above, the display screen 224 is configured to output a set of graphical outputs (or a first visual indicia) and a set of backlight outputs (or a second visual indicia), each associated with an operating status of the data processing unit 220. The operating status of the data processing unit 220 can be associated with the status of the power supplies 266, a status of a fan within the fan tray 264, a temperature of a particular portion of the data processing unit 220, a detected blockage within a cooling path or the like. In this manner, an observer can ascertain information about the operating status of the data processing unit 220 by observing the graphical outputs and/or the backlight outputs produced by the display screen 224.

As described above, the graphical outputs can include, for example, an alphanumeric code, graphical symbol, an icon, or the like. The display screen can be configured to change, update and/or produce a particular graphical output in response to the operating status of the data processing unit 220 and/or a change in such status. Additionally, in some embodiments, the display screen 224 can be configured to change the characteristics of the backlight output in response to the operating status of the data processing unit 220 and/or a change in such status. Such backlight characteristics can include, for example, a color of the backlight output, a brightness of the backlight output, a contrast of the backlight output and/or a pattern of the backlight output (e.g., on/off duration, frequency of a flashing pattern or the like).

Figure 5:
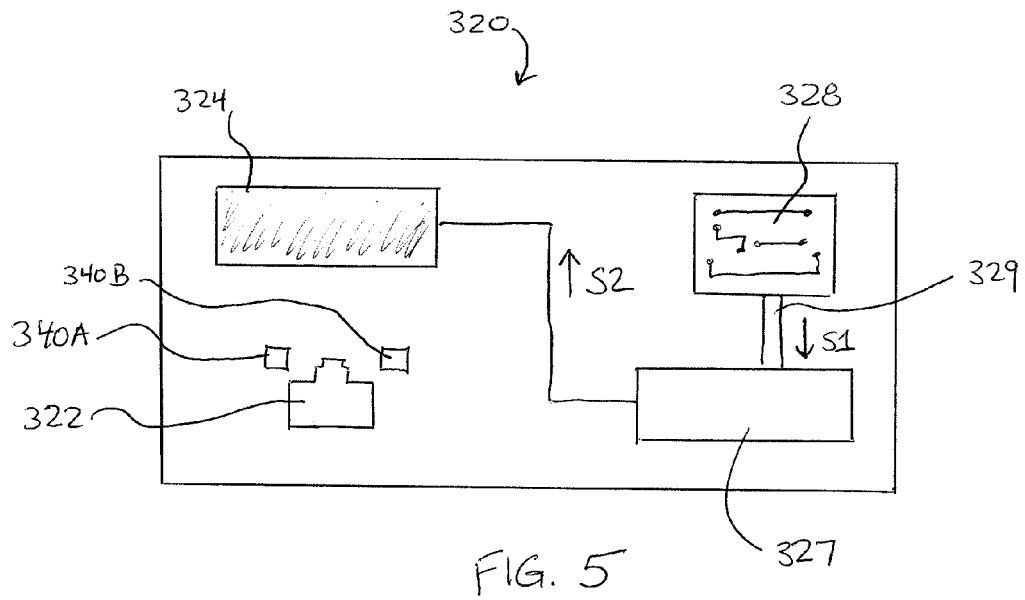
FIG. 5 is a schematic illustration of a data processing unit according to an embodiment.

FIG. 5 is a schematic illustration of a data processing unit 320 according to an embodiment that can be included within a data center network, such as the data center network 100 described above. The data processing unit 320 can be any suitable data processing unit of the types described herein. In some embodiments, for example, the data processing unit 320 can be an edge data processing unit and/or a core data processing unit of a data center network. In some embodiments, the data processing unit 320 can be a switch, a router, a server, a data storage unit (e.g., a memory device), line card or the like.

The data processing unit 320 includes network port 322, a set of light sources 340A, 340B, a display screen 324 and a display screen controller 327. The network port 322 is the physical and/or logical interface between the data processing unit 320 and other data processing units (not shown) within a communications network (e.g., a data center network). As described above, the network port 322 can include any number of connectors configured to receive and/or engage data transmission cables. In other embodiments, however, the network port 322 can be devoid of any physical connector. In such embodiments, the data processing unit 320 can be operatively coupled to the data center network 300 via a wireless connection.

The light sources 340A and 340B can be any suitable light source for outputting light, such as for example, light emitting diodes (LEDs). Each light source 340A and 340B is configured to output a set of light outputs (or visual indicia), associated with a status of the network port 322. Similarly stated, the light source 340A and the light source 340B are each configured to produce multiple different light outputs, each light output having a characteristic corresponding to a level of activity and/or a status of the network port 322. As described above, such characteristics can include a color of the light output, a brightness of the light output and/or a pattern (on/off duration, frequency of a flashing pattern or the like) of the light output. In this manner, an observer can ascertain information about the status of the network ports included within the data processing unit 320 by observing the output of the light source 340.

For example, in some embodiments, the light source 340A can be configured to output a solid GREEN output to indicate that a network link is established. The light source 340A can also be configured to output a flashing GREEN output to indicate that a network link is established and that there is activity (e.g., data transmission) along the link. Moreover, the light source 340A can be configured to produce the flashing light at a frequency that corresponds to a rate of data transmission (e.g., one blink per second corresponds to 10 Mbps, two blinks per second corresponds to 100 Mbps, etc.)

In some embodiments, the second light source 340B can be configured to produce a light output having characteristics associated with the mode of operation and/or the power status of the network port 322. For example, in some embodiments, the second light source 340B can produce a GREEN light indicating that "power over Ethernet" (PoE) status enabled. Similarly, the second light source 340B can produce a YELLOW light indicating a "power over Ethernet" (PoE) failure, and no light output if "power over Ethernet" is not enabled. The preceding are only examples of a possible mapping (or correlation) of the characteristics of the outputs produced by the first light source 340A and the second light source 340B to the status of the network port 322, and are not intended to be limiting.

The display screen 324 is configured to output a backlight output (or visual indicia) of the types shown and described herein. In some embodiments, the display screen 324 is also configured to output one or more graphical outputs (e.g., alphanumeric codes, icons or the like). The display screen controller 327 is configured to control and/or adjust the backlight output produced by the display screen 324 in response to a change in an operating status of the data processing unit 320. Similarly stated, the display screen controller 327 is configured to control and/or adjust a characteristic of the backlight output produced by the display screen 324 in response to a change in an operating status of the data processing unit 320. Such characteristics can include, for example, a color of the backlight output, a brightness of the backlight output, a contrast of the backlight output and/or a pattern of the backlight output (e.g., on/off duration, frequency of a flashing pattern or the like). In this manner, an observer can ascertain information about the operating status of the data processing unit 320 by observing the backlight outputs produced by the display screen 324.

The data processing unit 320 includes an alarm circuit 328 operatively coupled to the display screen controller 327 via a bus 329. The alarm circuit 328 can be any electronic circuit configured to produce a signal (e.g., signal S1) in response to a change in the operating status of the data processing unit 320. In some embodiments, for example, the alarm circuit 328 is configured to receive input associated with the status of a power supply, the temperature of a portion of the data processing unit 320, an airflow rate through a cooling passage defined by the data processing unit 320 or the like. The alarm circuit 328 can then process the received signal to determine if a change in the global status of the data processing unit 320 has occurred. Similarly stated, the alarm circuit 328 can process the received signal to determine if any fault limits have been exceeded. When such a change in operating status and/or fault condition exists, the alarm circuit 328 conveys the signal S1 to the display screen controller 327 via the bus 329. In some embodiments, the bus 329 includes an inter-integrated circuit ($I^2C$). Similarly stated, the display screen controller 327 can itself be controlled by the alarm circuit 328 through an $I^2C$ bus.

The signal S1 is received by the display screen controller 327, which then sends a signal S2 to the display screen 324 to control and/or change the backlight display in response to the change in the operating status of the data processing unit 320 as detected by the alarm circuit 328. The display screen controller 327 can be any suitable controller, such as, for example, a field programmable gate array (FPGA) or a complex programmable logic device (CPLD).

Figure 6:
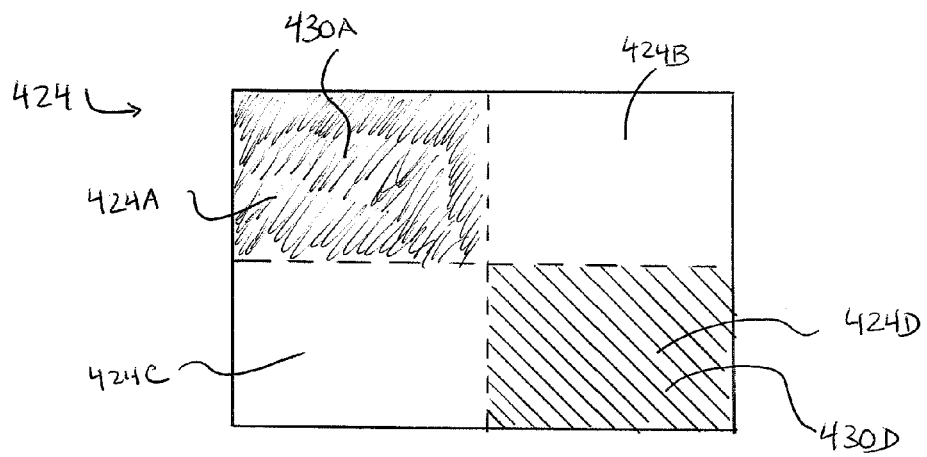
FIG. 6 is a display screen according to an embodiment including multiple different portions, each configured to produce a backlight output.

Although the display screens 124, 224 and 334 are shown and described above as producing a backlight output (or visual indicia) that occupies substantially the entire area of the display screen 124, 224 and 334, in other embodiments, a data processing unit can include a display screen configured to produce a backlight output occupying only a portion of the display screen. For example, FIG. 6 is a schematic illustration of a display screen 424 according to an embodiment. The display screen 424 can be operably coupled to any of the data processing units described herein. The display screen 424, which can be, for example, a liquid crystal display screen, includes a first screen portion 424A, a second screen portion 424B, a third screen portion 424C and a fourth screen portion 424D. The portions 424A, 424B, 424C and 424D are substantially distinct from each other.

The display screen 424 is configured to produce multiple different backlight outputs (or visual indicia) associated with an operating status of a data processing unit (not shown in FIG. 6), as described above. More particularly, the display screen 424 can produce multiple different backlight outputs having different characteristics, such that a particular backlight output is associated with (or corresponds to) an operating status of the data processing unit and/or a change in the operating status of the data processing unit. Such characteristics can include, for example, a color of the backlight output, a brightness of the backlight output, a contrast of the backlight output and/or a pattern of the backlight output (e.g., on/off duration, frequency of a flashing pattern or the like).

Moreover, the display screen 424 is configured to produce different backlight outputs on only a portion of the display screen. For example, the display screen can produce a first backlight output (indicated as the shaded region 430A) on the first portion 424A of the display screen 424 and a second backlight output (indicated as the shaded region 430D) on the fourth portion 424D of the display screen 424. In this manner, the display screen 424 can be configured to convey complex information about the operating status of the data processing unit in a qualitative manner. Such complex information can include, for example, the length of time since the operating status last changed, a severity of a fault, or the like. This arrangement allows an observer to ascertain detailed information about the data processing unit without requiring the observer to view a graphical output on the display screen (e.g., an alphanumeric fault code or the like). Thus, this arrangement can allow an observer to ascertain complex information about the data processing unit when the data processing unit is arranged within a cluster of other data processing units, when the observer is not directly in front of or in close proximity to the data processing unit and/or when the observer is more than approximately five feet away from the data processing unit.

For example, in some embodiments, a RED output on the first portion 424A of the display screen 424 can indicate that a temperature of a portion of the data processing unit has exceed a first predetermined threshold, and a RED output on the first portion 424A and the second portion 424B can indicate that the temperature of the portion of the data processing unit has exceed a second predetermined threshold. In other embodiments, the location of the backlight output on the display screen 424 (i.e., the portion of the display screen 424 in which the output is produced) can be correlated to a location on the data processing unit associated with the status and/or fault condition. For example, a flashing RED output in an upper portion of the display screen 424 (e.g., the first portion 424A or the second portion 424B) can indicate a fan failure within an upper fan tray of the data processing unit. Conversely, a flashing RED output in a lower portion of the display screen 424 (e.g., the third portion 424C or the fourth portion 424D) can indicate a fan failure within a lower fan tray of the data processing unit.

In other embodiments, the display screen 424 can produce various backlight outputs that toggle between various portions of the display screen. For example, in some embodiments, the display screen 424 can produce a first YELLOW backlight output that flashes at a first frequency on the first portion 424A of the display screen 424 and a second YELLOW backlight output that flashes at the first frequency, but out of phase with the first YELLOW backlight output, on the second portion 424B of the display screen 424. In this manner, the display screen 424 can appear to "move" between the first portion 424A and the second portion 424B. Such "movement" or toggling of backlight outputs can be used to indicate a change in status of the data processing unit.

Moreover, the divided screen arrangement also allows the display screen 424 to produce different backlight outputs substantially simultaneously. In this manner, an observer can ascertain information associated with multiple different faults or aspects of the status of the data processing unit simply by observing the backlight outputs display screen 424.

Figure 7:
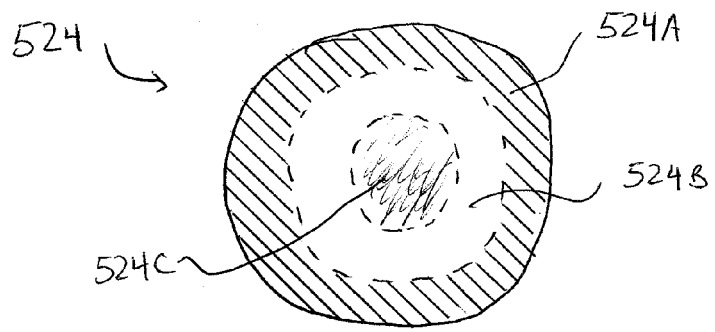
FIG. 7 is a display screen according to an embodiment including multiple different portions, each configured to produce a backlight output.

Although the display screen 424 is shown as being divided into substantially rectangular quadrants to define the portions 424A, 424B, 424C and 424D, in other embodiments, the display screen 424 can have any shape and/or can be divided into any number of portions having any shape. For example, FIG. 7 is a schematic illustration of a display screen 524 according to an embodiment having a substantially circular shape. The display screen 524 defines three concentric portions, 524A, 524B and 524C. The display screen is configured to produce multiple different backlight outputs (or visual indicia) associated with an operating status of a data processing unit (not shown in FIG. 7), as described above with reference to display screen 424.

Figure 8:
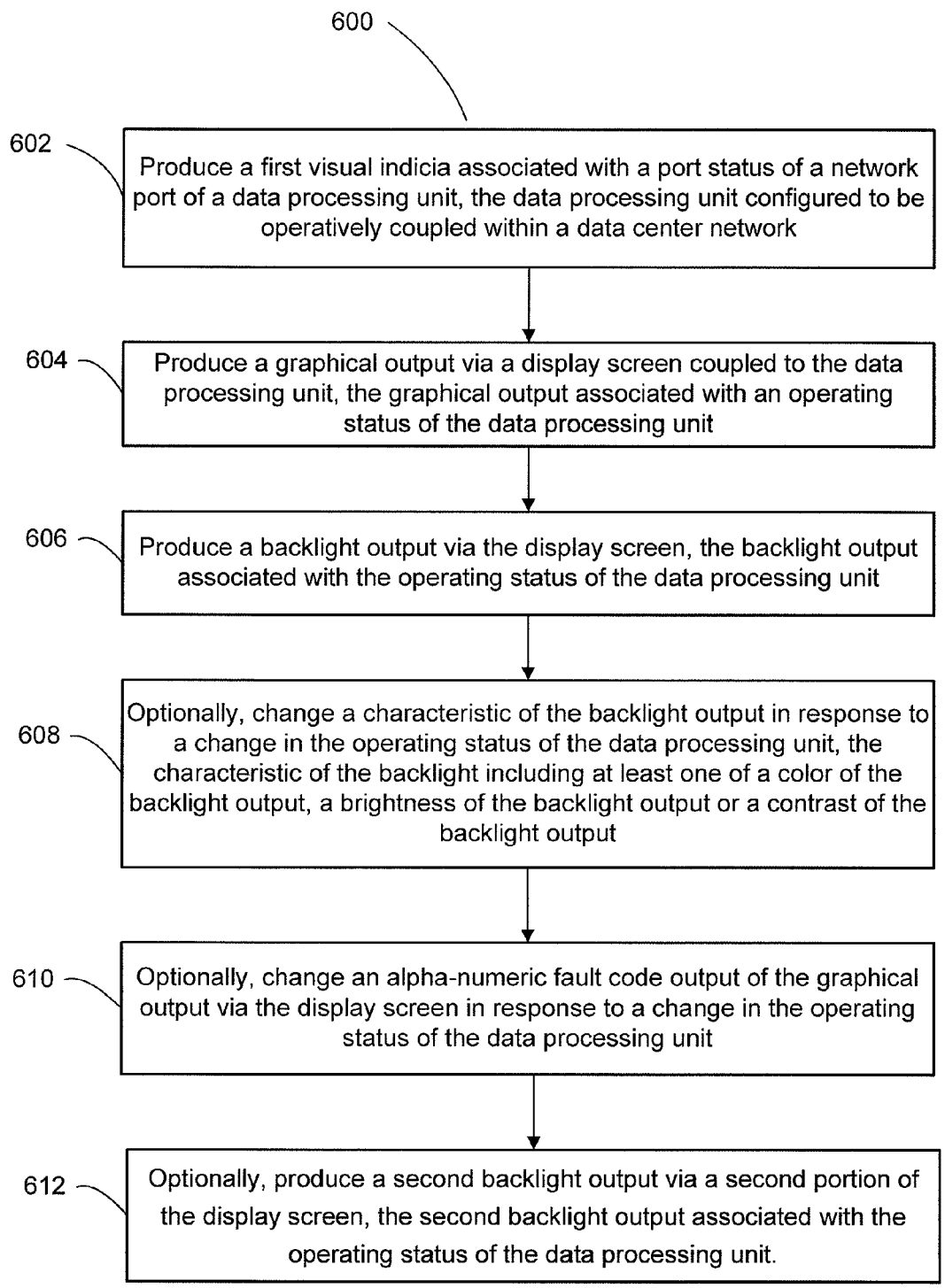
FIG. 8 is a flow chart of a method of producing a backlight output according to an embodiment.

FIG. 8 is a flow chart of a method 600 of producing visual indicia associated with a data processing unit according to an embodiment. The method includes producing a first visual indicia associated with a port status of a network port of a data processing unit, 602. The data processing unit can by any data processing unit of the types shown and described herein, and is configured to be operatively coupled within a data center network. A graphical output associated with an operating status of the data processing unit is produced via a display screen coupled to the data processing unit, 604. The graphical output can include for example, an alphanumeric code, graphical symbol, an icon, or the like. In this manner, an observer can ascertain information about the operating status of the data processing unit by observing the graphical output produced by the display screen. In some embodiments, the graphical output can include an alpha-numeric fault code associated with the status of the data processing unit. In such embodiments, the method can optionally include changing the alpha-numeric fault code output via the display screen in response to a change in the operating status of the data processing unit, 610.

A backlight output associated with the operating status of the data processing unit is via the display screen, 608. The backlight output can be any suitable backlight output of the types shown and described herein. For example, in some embodiments, a characteristic of the backlight output can be associated with the operating status of the data processing unit. For example, in some embodiments, the method optionally includes, changing a characteristic of the backlight output in response to a change in the operating status and/or an alarm condition of the data processing unit, 610. The characteristic of the backlight can include, for example a color of the backlight output, a brightness of the backlight output and/or a contrast of the backlight output.

In some embodiments, the backlight output is a first backlight output produced via a first portion of the display screen. In such embodiments, the method optionally includes producing a second backlight output associated with the operating status of the data processing unit via a second portion of the display screen, 612. In such embodiments, the display screen can be any suitable display screen, such as, for example, display screen 424 shown and described above.

The display screens (e.g., display screen 124) described herein can be any suitable display screen configured to produce the first set of graphical outputs (or a first visual indicia) and the set of backlight outputs (or a second visual indicia), as described above. For example, in some embodiments, any of the display screens described herein can be a liquid crystal display (LCD) screen, a cathode ray tube (CRT) screen, or the like.

The data processing units (e.g., data processing unit 120, 220 and 320), the display screen controller 327 and/or the alarm circuit 328 can be, for example, a commercially-available processing device configured to perform one or more specific tasks related to controlling the display screen as described herein. For example, the data processing units (e.g., data processing unit 120, 220 and 320), the display screen controller 327 and/or the alarm circuit 328 can include a microprocessor and a memory device. The microprocessor can be, for example, an application-specific integrated circuit (ASIC) or a combination of ASICs, which are designed to perform one or more specific functions. In yet other embodiments, the microprocessor can be an analog or digital circuit, or a combination of multiple circuits. The memory device can include, for example, a read only memory (ROM) component, a random access memory (RAM) component, electronically programmable read only memory (EPROM), erasable electronically programmable read only memory (EEPROM), and/or flash memory.

Although the data processing unit 320 is illustrated and described as including an display screen controller 327, in other embodiments, a data processing unit can include software in the form of processor-readable code instructing a processor to perform the functions described herein. In other embodiments, a data processing unit can include firmware that performs the functions described herein.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example. although the graphical outputs and the backlight outputs produced by the display screen 124 are described above as being associated with the operating status of the data processing unit 120, in other embodiments, the graphical outputs and the backlight outputs produced by the display screen 124 can be associated with the status of the network port 122.

Although various embodiments have been described as having particular features and/or combinations of components, other embodiments are possible having a combination of any features and/or components from any of embodiments as discussed above. For example, in some embodiments, a display screen can include substantially distinct portions each configured to output a backlight output, similar to the display screen 424 shown and described above and can also be configured to produce a graphical output similar to the display screen 124 shown and described above.

What is claimed is:

1. An apparatus, comprising:
a data processing unit configured to be operatively coupled within a data center network, the data processing unit configured to output a first visual indicia, a second visual indicia and a third visual indicia,
the first visual indicia including a plurality of light outputs, each light output from the plurality of light outputs associated with a port status of a network port of the data processing unit, at least one light output from the plurality of light outputs being indicative of a Power over Ethernet (PoE) status of the data processing unit,
the second visual indicia including a plurality of graphical outputs produced by a display screen, each graphical output from the plurality of graphical outputs associated with an operating status of the data processing unit,
the third visual indicia including at least a first backlight output produced by a first portion of the display screen and a second backlight output produced by a second portion of the display screen, the second backlight output different from the first backlight output, the first backlight output and the second backlight output each being uniquely associated with a characteristic from a plurality of characteristics associated with the operating status of the data processing unit, each characteristic from the plurality of characteristics including at least one of a brightness or a contrast,
the data processing unit being configured to adjust the brightness of the first backlight output when the operating status of the data processing unit associated with the first backlight output has changed within a first predetermined time period, and
the data processing unit is configured to adjust the brightness of the second backlight output when the operating status of the data processing unit associated with the second backlight output has changed within a second predetermined time period, the data processing unit configured to adjust the brightness of the first backlight output when the second backlight output is produced by the second portion of the display screen.

2. The apparatus of claim 1, wherein the data processing unit is at least one of an access switch, a router, a server or a data storage device.

3. The apparatus of claim 1, wherein the data processing unit includes a light emitting diode configured to produce the plurality of light outputs of the first visual indicia, each light output from the plurality of light outputs having a characteristic associated with the port status.

4. The apparatus of claim 1, wherein the port status of the network port is associated with at least one of a link activity of the network port, a mode of operation of the network port or a speed of data transmission via the network port.

5. The apparatus of claim 1, wherein the operating status of the data processing unit includes at least one of a fan fault, a thermal fault or a power supply fault.

6. An apparatus, comprising:
a data processing unit configured to be operatively coupled within a data center network, the data processing unit including:
a network port configured to operatively couple the data processing unit to another data processing unit associated with the data center network;
a plurality of light emitting diodes, each light emitting diode from the plurality of light emitting diodes configured to produce an output having a characteristic associated with a status of the network port, at least one light emitting diode from the plurality of light emitting diodes being indicative of a Power over Ethernet (PoE) status of the data processing unit;
a display screen having a first portion and a second portion different from the first portion, the first portion configured to produce a first backlight output associated with a first location of the data processing unit, the second portion configured to produce a second backlight output associated with a second location of the data processing unit, a characteristic of the second backlight output different from a characteristic of the first backlight output, the display screen configured to produce the first backlight output and the second backlight output substantially simultaneously, the first portion of the display screen being distinct from and substantially surrounded by the second portion of the display screen; and
a display controller configured to control the first backlight output in response to a change in an operating status of a component adjacent the first location of the data processing unit.

7. The apparatus of claim 6, wherein the change in the operating status of the component is associated with at least one of a fan fault, a thermal fault or a power supply fault.

8. The apparatus of claim 6, wherein the display controller is configured to adjust at least one of a color of the first backlight output, a brightness of the first backlight output or a contrast of the first backlight output.

9. The apparatus of claim 6, wherein:
the change in the operating status of the component is a first change;
the first portion of the display screen is configured to produce a third backlight output, a characteristic of the third backlight output being different than the characteristic of the first backlight output; and
the display controller is configured to produce the third backlight output in response to a second change in the operating status of the component.

10. The apparatus of claim 6, wherein the display controller includes a field programmable gate array operatively coupled to an alarm circuit of the data processing unit via an inter-integrated circuit bus, the field programmable gate array configured to receive a first signal associated with the change in the operating status of the component from the alarm circuit and transmit a second signal to the display screen.

11. The apparatus of claim 6, wherein the display screen is configured to output a graphical indicia associated with the operating status of the component.

12. The apparatus of claim 6, wherein:
the component is a first component; and
the display controller is configured to control the second backlight output in response to a change in an operating status of a second component adjacent the second location of the data processing unit.

13. A method, comprising:
producing a first visual indicia associated with a port status of a network port of a data processing unit, the data processing unit configured to be operatively coupled within a data center network, the first visual indicia being indicative of a Power over Ethernet (PoE) status of the data processing unit;
producing a graphical output via a display screen coupled to the data processing unit, the graphical output associated with an operating status of the data processing unit;
producing a first backlight output via a first portion of the display screen at a first frequency, the first portion of the display screen associated with a first portion of the data processing unit, the producing the first backlight output performed in response to a change in an operating status of a first component within the first portion of the data processing unit and not in response to an operating status of a second portion of the data processing unit; and
producing a second backlight output via a second portion of the display screen at a second frequency, the second backlight output different than the first backlight output, the second portion of the display screen associated with the second portion of the data processing unit, the producing the second backlight output performed in response to a change in the operating status of a second component within the second portion of the data processing unit and not in response to the operating status of the first portion of the data processing unit, the second backlight output being produced by the second portion of the display screen when the first backlight output is produced by the first portion of the display screen,
the first frequency being out of phase with the second frequency.

14. The method of claim 13, further comprising:
changing a characteristic of the first backlight output in response to a change in the operating status of the first component, the characteristic of the first backlight output including at least one a brightness of the first backlight output or a contrast of the first backlight output.

15. The method of claim 14, wherein the changing the characteristic of the first backlight output includes changing the characteristic in response to a change in an alarm condition associated with the operating status associated with the first component.

16. The method of claim 13, wherein the graphical output includes an alpha-numeric fault code, the method further comprising:
changing the alpha-numeric fault code output via the display screen in response to a change in the operating status of the data processing unit.

17. The apparatus of claim 1, wherein the display screen is configured to produce the first backlight output and the second backlight output substantially simultaneously.

18. The apparatus of claim 1, wherein the display screen is configured to produce the first backlight output at a frequency that is out of phase with a frequency with which the second backlight output is produced.

19. The apparatus of claim 1, wherein the first portion of the display screen is distinct from the second portion of the display screen.

20. The apparatus of claim 6, wherein the first portion and the second portion of the display screen are in circular shape.

21. The method of claim 13, wherein the first portion of the display screen is circular in shape and is distinct from and substantially surrounded by the second portion of the display screen.

* * * * *